United States Patent Office  3,069,375
Patented Dec. 18, 1962

3,069,375
AQUEOUS POLYMERIZATION OF CARBOXYLIC MONOMER USING COLLOIDAL SILICA AND RESULTING PRODUCT
Orville H. Bullitt, Jr., Newtown Square, and Richard R. Storrow, Drexel Hill, Pa., assignors to E. I. du Pont de Nemours and Company, Wilmington, Del., a corporation of Delaware
No Drawing. Filed Oct. 4, 1957, Ser. No. 688,132
17 Claims. (Cl. 260—29.3)

This invention relates to stable aqueous dispersion copolymer compositions characterized by improved application properties dependent on a high surface tension value. More particularly the invention pertains to improved aqueous disperson acrylic copolymer coating compositions adapted for wire coating, the improvement primarily relating to altered application characteristics which permit coating of wire at speeds higher than those ordinarily found to be adequately operative with aqueous dispersion coating compositions.

Coating of wire ordinarily is accomplished by passing a strand of wire through a bath of liquid coating and through a baking oven to dry and cure the coating picked up by the moving wire. The wire is recycled through the bath and oven until the wire is provided with the desired increase in diameter corresponding to the desired coating thickness of electrical insulation. The wire ordinarily is withdrawn vertically from the coating bath and passed through a coating die which serves as a wiper to aid in controlling the coating weight or thickness per pass and to provide uniformity in the coating. Moderate gauge wire, such as 20 AWG, and heavier gauge wire generally are coated at a speed of from 20 feet to about 35 feet per mintue. Finer gauge wire is coated at speeds of 30 to 45 feet per minute and sometimes at still higher speeds. At these coating speeds, the oven must be of sufficient heat-capacity and sufficient length to adequately dry and cure the coating during its short exposure to oven temperatures.

U.S. Patent 2,787,603 describes aqueous dispersion wire enamel compositions comprising an aqueous emulsion polymerized acrylic copolymer and a water-dilutable, heat-reactive phenol-aldehyde condensation resin. These aqueous compositions are applicable to heavy gauge wire at ordinary commericaly practical speeds used in coating wire of the same gauge from an organic solvent solution of electrical insulating composition. However, for fine gauge wire, such as 20 AWG to 30 AWG, coating speeds with the aqueous dispersion copolymer wire enamel compositions cannot be accelerated to equal the high speeds normally used in the industry to coat such fine gauge wire. At coating speeds greater than 35 feet per minute, the insulating enamel deposited from the aqueous dispersion composition is rough or sandy in appearance and frequently there are skips in the coating which results in inadequate insulation.

An object of this invention is to provide advantageous improvements in the aqueous dispersion copolymer coating compositions of U.S. Patent 2,787,603 whereby the aqueous compositions can be satisfactorily applied at speeds at least equal to those ordinarily used in the wire coating industry. Another object is to provide aqueous dispersion copolymer coating compositions characterized by improved properties relating to application by dipping and flow coat methods. A still further object is to provide a method of preparing aqueous dispersion coating compositions having improved application characteristics which are dependent on a high surface tension value. Still other objects will be disclosed or will become apparent as the description of the invention proceeds.

These important objects are accomplished by employing a polymerization process which comprises the steps of (a) forming a homogeneous dispersion comprising water and a mixture of alpha ethylenically unsaturated monomers, at least ternary in composition, comprising (A) at least one monoethylenically unsaturated monocarboxylic acid, (B) at least one ester of a saturated monohydric alcohol and a monoethylenically unsaturated monocarboxylic acid having an alpha bound terminal methylene group, and (C) at least one nitrile of a monoethylenically unsaturated monocarboxylic acid having an alpha bound terminal methylene group, (b) initiating a copolymerization reaction in the presence of a vinyl polymerization catalyst and effecting the copolymerization of the monomers in the presence of colloidal silica present as an alkali-stabilized silica aquasol in an amount of at least .1% of silica based on the weight of the polymerizable monomers, (c) forming an ammonium salt of the copolymer by ammoniacal neutralization of the carboxylic component of the copolymer and (d) stabilizing the aqueous dispersion of the ammonium salt of the copolymer by heating the aqueous product from 45° C. to 95° C. and thereafter cooling to room temperature. Aqueous dispersion wire enamel compositions having a surface tension of at least 50 dynes/cm. are formulated by mixing the stabilized aqueous dispersion copolymer composition with an effective minor proportion of at least one water-dilutable, heat-reactive condensate containing methylene bridges, —CH$_2$—, as the propogating moiety of the condensate.

A pertinent difference between the invention process outlined above and ordinary methods of emulsion polymerization is that the monomers are dispersed in water in the absence of ionic and non-ionic emulsifiers which have the effect of significantly lowering the surface tension of the aqueous product. The functioning of the alkali-stabilized sol of colloidal silica does not correspond to the emulsifying activity of conventional anionic, cationic and non-ionic emulsifiers.

The activity of the alkali-stabilized silica aquasol in the process is not fully understood, but it is best explained on the basis of coaction between the carboxylic acid monomer component (A) and the alkali-stabilized colloidal silica of the aquasol. In the absence of the carboxylic acid component (A), the non-acidic monomers and resulting polymers are not adequately dispersed in water in the presence of the alkali-stabilized silica aquasol without the supplemental aid of an ordinary emulsifier.

A significant result of the presence of the alkali-stabilized silica aquasol in the aqueous polymerization recipe in the absence of ordinary emulsifiers is a high value of the surface tension of the aqueous copolymer dispersion and coating compositions prepared therefrom and an advantageously increased viscosity yield value. Aqueous wire enamel compositions prepared following the teachings of U.S. Patent 2,787,603 ordinarily exhibit a surface tension of about 40 dynes per centimeter using an anionic emulsifier such as sodium lauryl sulfate, and a low viscosity yield value. Corresponding wire enamel compositions prepared from the invention copolymer dispersions containing alkali-stabilized silica aquasol exhibit a surface tension of at least 50 dynes/cm. and ordinarily from about 55 to about 62 dynes/cm. This significant difference in surface tension reflects a pertinent difference in application properties, particularly in reference to the rate at which the aqueous coating can be applied, that is coating speed, and the smoothness of the appearance of the resulting applied insulating enamel. The aqueous coating bath is non-foaming. The aqueous dispersion wire enamel products of the invention characterized by a surface tension value from 50 to about 70 dynes/cm. are satisfactorily applicable to wire on commercial coating machines at coating speeds up to 65 feet per minute, a speed from 1.5 to 3 times as fast as that heretofore found to be satisfactorily operable with aqueous dispersion wire enamel compositions.

Silica aquasols useful in the practice of this invention are aqueous sols of alkali-stabilized colloidal silica wherein the approximate particle size of the colloidal silica is from 5 millimicrons to 150 millimicrons.

A proportion of stabilizing alkali for the colloidal silica corresponding to a weight ratio of from about 75 parts to about 700 parts of $SiO_2$ per part of alkali expressed as $Na_2O$ is operative. Although the stabilizing alkali is expressed as $Na_2O$ and silica aquasols stabilized with $Na_2O$ are more readily available, silica aquasols containing a corresponding proportion of $K_2O$, $Li_2O$, $NH_3$, and lower alkyl ammonia as the stabilizing alkali are equally effective.

Silica aquasols having the described characteristics are commercially available from E. I. du Pont de Nemours and Co., Inc. as "Ludox" colloidal silica. These silica aquasols are prepared according to the teachings of U.S. Patents 2,574,902 and 2,577,485. Physical properties and approximate chemical compositions of representative commercial available grades of "Ludox" colloidal silica are shown in the following table.

TABLE 1

| | "Ludox" LS | "Ludox" SM | "Ludox" HS | 100 millimicron colloidal solids |
|---|---|---|---|---|
| Percent Colloidal Silica | 30.0 | 15.0 | 30.0 | 24.9 |
| $SiO_2/Na_2O$ Wt. Ratio | 285 | 155 | 95 | 693 |
| Viscosity at 25° C., Cps | 13 | 4.3 | 3.6 | |
| pH at 25° C | 8.4 | 8.5 | 9.8 | |
| Surface Area, $m^2/g$. $SiO_2$ | 210 | 400 | 210 | 3 |
| Approximate Particle Diameter (expressed as millimicrons) | 15 | 7 | 15 | 100 |

The surface area in Table 1 expressed in square meters per gram of silica is determined by the nitrogen absorption method described in P. H. Emmett's "Symposium on New Methods for Particle Size Determination," p. 95, published by A.S.T.M. March 4, 1941.

Alkali present in the silica aquasol in stabilizing proportions for the colloidal silica ordinarily provides a pH from about 8 to about 10 for the above-described concentrated aquasols.

The presence of an amount of the alkali-stabilized silica aquasol corresponding to as little as .1% of colloidal silica expressed as $SiO_2$ based on the total weight of the polymerizable organic monomers in the polymerization recipe is effective in registering an improvement in performance of the product. A concentration corresponding to as much as 5% of colloidal silica based on the weight of the polymerizable monomers can be present effectively in the polymerization recipe, an amount from .25% to 2% being preferred. Still higher proportions of colloidal silica can be present during polymerization, but the effectiveness toward improvement of the application properties of the aqueous product is not significantly greater than that of 5%, proportions of colloidal silica in excess of 5% ordinarily functioning as a pigment or extender.

Organic monomer component (A) can be any monoethylenically alpha unsaturated monocarboxylic acid, preferably having a terminal methylene group bound to the alpha carbon atom, or mixtures of such acids. Representative useful acids include for example

| | |
|---|---|
| Acrylic acid | Beta, beta dimethyl acrylic acid |
| Methacrylic acid | |
| Alpha ethyl acrylic acid | Angelic acid |
| Alpha phenyl acrylic acid | Tiglic acid |
| Beta phenyl acrylic acid | Isohydrosorbic acid |
| Crotonic acid | Beta ethyl acrylic acid |
| Isocrotonic acid | |

These acids also can be further identified generically by the general formula $$R''-C=C-COOH$$
$$\phantom{R''-}R'\phantom{=}R$$

where R—, R'— and R''— can each be —H, a saturated lower alkyl hydrocarbon radical having from 1 to 6 carbon atoms or phenyl, at least one, preferably two, of R—, R'— and R''— being hydrogen, and most preferably R'— and R''— being hydrogen, thus providing a terminal methylene group bound to the alpha carbon atom.

The proportion of monomer component (A) can vary from 1% to 15%, preferably from 2% to 10%, based on the total weight of the copolymerizable organic monomers, that is (A), (B) and (C).

Organic monomer component (B) can be any ester of a monoethylenically unsaturated monocarboxylic acid having a terminal methylene group bound to the alpha carbon atom and a monohydric alcohol free from unsaturation except for aromatic ring unsaturation, and mixtures thereof. The ester-forming acid can be acrylic acid, methacrylic acid, alpha ethylacrylic acid and alpha phenyl acrylic acid. The ester-forming monohydric alcohol can be any 1 to 20 carbon atom monohydric alcohol free from unsaturation other than aromatic ring unsaturation. The organic radical thereof can be aliphatic, acyclic, straight-chain, branched chain, cyclo-aliphatic, aryl, alkaryl, or aralkyl. The organic radical preferably consists of carbon and hydrogen atoms, but useful ester-forming monohydric alcohols can contain one or more oxygen atoms separated by at least two carbon atoms each of which has at least one hydrogen atom bound thereto as in monoethers of polymethylene glycols and monoethers of polyoxyalkylene glycols.

Examples of useful ester-forming monohydric alcohols include the following: methyl alcohol, ethyl alcohol, propyl alcohol, isopropyl alcohol, butyl alcohol, isobutyl alcohol, pentanol, cyclopentanol, 2 ethylbutanol, cyclohexanol, 2 ethylhexanol, hexanol, heptanol, octanol, decanol, dodecanol, octadecanol, lauryl alcohol, stearyl alcohol, ethylene glycol monomethyl ether, ethylene glycol monoethyl ether, diethyleneglycol monoethyl ether, triethylene glycol monoethyl ether, triethylene glycol monobutyl ether, propyleneglycol monoethyl ether, polyoxypropylene glycol monobutyl ether, phenol, benzyl alcohol, phenylethyl alcohol, tetrahydro beta naphthol, tetra hydrofurfuryl alcohol.

The acrylates and methacrylates of 1 to 8 carbon atom saturated aliphatic monohydric alcohols are preferred of the various useful esters.

The proportion of monomer component (B) can be from about 15% to about 65% preferably from 23% to 45% based on the total weight of the monomers (A), (B) and (C).

Organic monomer component (C) can be any nitrile of a monoethylenically unsaturated monocarboxylic acid having a terminal methylene group bound to the alpha carbon atom as defined above for the ester-forming acid of component (B) or mixtures of such nitriles. Acrylonitrile is particularly preferred.

The proportion of monomer component (C) can be from 30% to 80%, preferably 45% to 75%, based on the total weight of the monomers (A), (B) and (C).

Certain auxiliary copolymerizable ethylenically unsaturated monomers other than defined by (A), (B) and (C) can be included in the monomer mixture in minor proportions up to 25% by weight of the mixture.

Auxiliary alpha ethylenically unsaturated monomers which can be used are free from carboxylic acid substituents and contain not more than two sites of ethylenic unsaturation, each of which constitutes an alpha bound terminal methylene group. Useful auxiliary monomers having a single site of alpha ethylenic unsaturation include the vinyl aromatic hydrocarbons such as styrene, alpha methyl styrene, vinyl toluene, and esters of epoxy alcohols, such as esters of 2,3 epoxy-propanol-1 and a monoethylenically unsaturated monocarboxylic acid having an alpha bound terminal methylene group of which glycidyl methacrylate is a representative ester.

Typical useful auxiliary monomers containing two sites of alpha bound methylene unsaturation include divinyl benzene and diesters of polymethylene glycols and polyoxyalkylene glycols with a monoethylenically unsaturated monocarboxylic acid having an alpha bound terminal methylene group.

The auxiliary monomer when it contains only monoethylenic insaturation can be usefully present in an amount up to 25% based on the total weight of the copolymerizable organic monomers, the preferred concentration being from 1% to 10%. When the auxiliary monomer contains two sites of alpha bound terminal methylene unsaturation as in divinyl benzene and methacrylic acid diesters of glycols, significant cross-linking of the copolymer can occur with a small fractional percentage of these polyfunctional monomers. When these difunctional monomers are present, the preferred proportion is from .3% to 3% based on the total weight of the weight of the polymerizable organic monomers.

In carrying out the process of preparing the invention copolymer dispersion compositions, the polymerizable organic monomers are initially homogeneously dispersed in water preferably containing the alkali-stabiilzed colloidal silica. The dispersion is preferably formed by passing the aqueous mixture through a high speed homogenizer. The presence of the colloidal silica in the mixture at this initial stage is not significantly critical. The alkali-stabilized silica aquasol can be introduced into the mixture either before or immediately on initiation of the polymerization reaction. If desired, the addition of the colloidal silica can be step-wise. For example, a fraction of the total colloidal silica can be added to the initial mixture in preparing the homogeneous dispersion with the balance of the colloidal silica being added on initiation of the polymerization reaction. The alkali-stabilized colloidal silica aquasol can be added in increments during polymerization provided the composition immediately on initiation of the polymerization reaction contains at least .1% of the colloidal silica based on the weight of the polymerizable organic monomers. Thereafter the homogeneous mixture is transferred to a polymerization vessel where it is heated preferably to from about 50° to about 70° C., combined with the vinyl polymerization catalyst and agitated at moderate speed to maintain the homogeneity of the aqueous composition, thereby initiating an exothermic polymerization reaction. Heat is withdrawn from the polymerization charge to control the rate of reaction. Although about 60° C. is a particularly preferred operating temperature, the polymerization can be carried out at temperatures from 0° up to the boiling temperature of the monomer charge by selective choice of catalysts.

Polymerizable monomers as purchased ordinarily contain polymerization inhibitors. These inhibitors generally are removed and the monomers are used as freshly distilled material or as inhibitor-free material separated from the inhibitor or other means. Complete removal of polymerization inhibitors is not essential. Polymerization can be satisfactorily carried out in the presence of an inhibitor concentration as high as 100 parts of hydroquinone per million of monomer charge, but a concentration less than 40 parts per million is preferred.

The proportion of organic monomer mixture in the aqueous polymerization recipe preferably is from about 25% to 45% based on the total weight of the composition. The monomer mixture can be present at a concentration as low as 10% and as great as 60% by weight but coagulation losses make operations at concentrations above 50% uneconomical.

The water used in the polymerization recipe preferably is pure water of distilled, deionized or demineralized quality.

Any of the well known vinyl polymerization catalysts which are operative in an aqueous medium, preferably peroxy catalysts, can be used in ordinary amounts. Polymerization conditions can be varied to conform with the requirements of the catalyst employed.

A water-soluble redox catalyst system is preferred, particularly the bisulfite/persulfate system. The proportion of total redox catalyst can be from .1% to 1%, preferably .25% to .5%, based on the total weight of the polymerizable monomers. The weight ratio of redox system can vary from 1 to 10 parts of persulfate per part of bisulfite.

The reducing component of the redox catalyst ordinarily is included in the polymerization charge prior to the homogenizing step. A portion of this component can be withheld to be added during polymerization. The oxidizing component can be added as a single charge or portion-wise during polymerization.

Vinyl polymerization ordinarily is carried out in the presence of an inert gas, such as nitrogen, to exclude oxygen or air. Although this practice can be adhered to in the process of this invention, it is not necessary to exclude air. In fact, with the redox catalyst system it is desirable and preferred to saturate the aqueous polymerization charge with air during the homogenizing step.

The polymerization recipe is so adjusted that the polymerization reaction period, as measured by the duration of the exothermic reaction, is from about 60 minutes to about 180 minutes. In faster reactions, it is difficult commercially to adequately dissipate the heat. The reaction can be slower than 180 minutes, but exothermic reaction periods longer than 360 minutes are impractically long for commercial operation.

Mixing under the polymerization conditions is ordinarily carried out for from about 30 minutes to 120 minutes after the exothermic reaction subsides.

Agitation during polymerization is moderate, preferably at an agitator speed of from 150 to 300 r.p.m. Other means of agitation which provide adequate heat transfer and maintain the dispersion of the monomers and the resulting copolymers can be used. High speed agitation ordinarily is avoided to minimize coagulation or coalescence under the mechanical shear.

At completion of the polymerization, the dispersed copolymer is characterized by an average particle size ordinarily from .05 micron to .4 micron, an average molecular weight from about 250,000 to 800,000 as determined by light scattering, and a relative viscosity of from 2.5 to 10.0 based on a 0.5% solution of the copolymer in dimethylformamide.

The resulting acidic aqueous dispersion, ordinarily having a pH less than 4, is ammoniacally neutralized to a pH of from 5.5 to 6 and filtered to remove coagulum. Partial conversion of the carboxyl substituents of the acidic copolymer to the ammonium salt stabilizes the aqueous dispersion against further growth of coagulum and polymer grit which ordinarily occurs when the copolymer is stored or mechanically treated in its unneutralized acidic state.

The filtered ammoniacal aqueous dispersion is then further ammoniacally neutralized to a pH h:gher than the first stage neutralization up to pH 8, preferably from 6.7 to 7.7, and heat-processed at a temperature of from 45° C. to 95° C., preferably 65° C. to 90° C., for a period of from 5 minutes to about 240 minutes, preferably 15 to 120 minutes. Thereafter the aqueous dispersion is cooled to room temperature. This ammoniacal heat-processing step provides the product with package-stability and a stable viscosity.

If the final aqueous product is adequately low in viscosity and non-volatile content for easy filtration, ammoniacal neutralization can be carried out in a single stage to a pH of from 6.7 to 8 and heat processed as described. In commercial practice, it is convenient to carry out the two stage ammoniacal neutralization because the first stage can be carried out in the polymerization vessel and the second stage in a heat processing mixer with a filtration step carried out during the transfer from the polymerization vessel to the mixer.

The ammoniacal heat processing step of stabilizing aqueous acidic copolymer prepared by emulsion polymerization is claimed in copending application Sanders Serial No. 578,405, filed April 16, 1956, now U.S. Patent 2,866,763.

In preparing the aqueous dispersion electrical insulating compositions, the ammoniacal aqueous dispersion of the copolymer is uniformly mixed with the water-dilutable, heat-reactive condensate containing methylene bridges as the propagating moiety, which condensate ordinarily is in the form of an aqueous solution or aqueous dispersion of resin particles of colloidal size.

The water-dilutable, heat-reactive condensate can be any of the well known condensates derived from formaldehyde, as one of the reactants, which provides methylene bridges, —$CH_2$—, as the propagating moiety of the condensate. Phenol/formaldehyde condensates are particularly preferred. Ketone/formaldehyde condensates, ketone/urea/formaldehyde condensates, urea/formaldehyde condensate, melamine/formaldehyde condensates, urea/melamine/formaldehyde condensates or mixtures thereof can be used in partial or full replacement of the phenol/formaldehyde or on equal weight basis in the described formulations.

The proportion of these condensates can be from 1% to 40%, preferably from 3% to 15%, based on the weight of the aqueous dispersed copolymer.

The heat-reactive condensate, particularly phenol/formaldehyde condensate, can be either mixed with the ammoniacal heat-processed aqueous copolymer dispersion or added to the copolymer dispersion after the first stage neutralization and processed with the copolymer during the second stage ammoniacal heat-processing.

Sometimes it is desirable to enhance the coalescing properties of the coating composition by including a small effective proportion of a water-soluble solvent for the copolymer in the aqueous coating formulation. Typical suitable coalescing agents include tetramethylene sulfone, cyclic ethylene carbonate, dimethylformamide, dimethyl acetamide, alkyl monoethers of ethylene glycol or diethylene glycol, and diacetone alcohol.

For wire coating and preparation of electrical insulation material by impregnation of fiber-glass, textiles and paper, the aqueous dispersion products ordinarily are used without further modification except for dilution with water to a preferred consistency and non-volatile content for application and ammoniacal adjustment to a preferred application alkalinity. Although a wide range in application consistency can be obtained as a result of the ammoniacal heat-processing step and by variation in the non-volatile content of the compositions, it is sometimes desirable to include conventional water dispersible bodying agents in the composition. Typical representative bodying agents include methyl cellulose, polyvinyl alcohol, alkali-metal and ammonium salts of polyacrylic acid, polymethacrylic acid, or commercially available salt-forming acidic acrylic copolymer emulsions, "Acrysol" ASE-60 and "Acrysol" ASE-75 supplied by Rohm and Haas being representative of these useful acidic acrylic copolymer emulsions. The bodying agent ordinarily can be added at any stage in the process of preparing the product, but generally it is preferred to make the addition after copolymerization and ammoniacal neutralization of the resulting acidic copolymer. These agents, when present, are used in minor proportions, ordinarily less than 3% based on the non-volatile content of the composition.

For a general utility of the product for coating metallic and non-metallic substrates, the aqueous dispersion compositions can contain pigments, fillers, dyes, compatible plasticizers, compatible resins, stabilizers, inhibitors, and other adjuvants ordinarily used in coating compositions. Aqueous suspensoids of polytetrafluoroethylene and polyvinyl fluoride are particularly useful resinous modifiers. Particulate silica of microscopic particle-size, such as silica aerogel, and colloidal silica, such as the described "Ludox" colloidal silica, supplemental the colloidal silica content of the invention products can be advantageously used as pigments and extenders.

The following Table 2 shows typical polymerization recipes of which compositions A and B are representative comparative products and Examples 1 to 5 are representative of the invention. Composition A corresponds to the recipe for the aqueous emulsion polymerized copolymers specified in formulating the products claimed in U.S. Patent 2,787,603. Composition B is a modification of Composition A containing an anionic emulsifier at a concentration significantly lower than that ordinarily specified in aqueous emulsion polymerization recipes and a small proportion of colloidal silica.

TABLE 2

|  | Comparative Products | | Example | | | | |
|---|---|---|---|---|---|---|---|
|  | A | B | 1 | 2 | 3 | 4 | 5 |
|  | Percent | Percent | Percent | Percent | Percent | Percent | Percent |
| First Portion: |  |  |  |  |  |  |  |
| Water | 62.40 | 61.96 | 62.00 | 61.88 | 61.87 | 60.75 | 61.35 |
| Sodium Lauryl Sulfate | .19 | .04 |  |  |  |  |  |
| Silica Aquasol—Sodium Stabilized 30% $SiO_2$ |  | .59 | .59 |  | .59 | 1.20 | .60 |
| Silica Aquasol—$NH_3$ Stabilized 25% $SiO_2$ |  |  |  | .71 |  |  |  |
| Sodium Meta Bisulfite | .03 | .03 | .03 | .03 | .03 | .03 | .03 |
| Methacrylic Acid | 1.77 | 1.77 | 1.77 | 1.77 | 1.60 | 1.80 | 1.10 |
| Butyl Acrylate | 11.30 | 11.30 | 11.30 | 11.30 | 10.20 | 10.80 |  |
| Ethyl Acrylate |  |  |  |  |  | 10.80 | 11.50 |
| Acrylonitrile | 22.30 | 22.30 | 22.30 | 22.30 | 20.10 | 12.60 | 22.60 |
| Styrene |  |  |  |  | .3.60 |  |  |
| Glycidyl Methacrylate |  |  |  |  |  |  | .80 |
| Second Portion: |  |  |  |  |  |  |  |
| Water | 1.56 | 1.56 | 1.56 | 1.56 | 1.56 | 1.56 | 1.56 |
| Potassium Persulfate | .11 | .11 | .11 |  | .11 | .12 | .12 |
| Ammonium Persulfate |  |  |  | .11 |  |  |  |
| Third Portion: |  |  |  |  |  |  |  |
| Ammonium Hydroxide 28% $NH_3$ | .12 | .12 | .12 | .12 | .12 | .12 | .12 |
| Water | .22 | .22 | .22 | .22 | .22 | .22 | .22 |
|  | 100.00 | 100.00 | 100.00 | 100.00 | 100.00 | 100.00 | 100.00 |

In these polymerization recipes, the composition of the polymerizable monomer mixture in Examples 1 and 2 and in the comparative compositions A and B consists of 5% of methacrylic acid, 32% of butyl acrylate and 63% by weight of acrylonitrile. In Example 3, 90% of the monomer mixture consists of these same three monomers in the same relative proportions and 10% of styrene as an auxiliary copolymerizable monomer. In Example 4, the monomer mixture consists of 5% methacrylic acid, 60% of an equal weight mixture of butyl acrylate and ethyl acrylate, and 35% by weight of acrylonitrile. In Example 5, the polymerizable monomer mixture consists of about 3% of methacrylic acid, 32% of ethyl acrylate, 63% of acrylonitrile and about 2% by weight of glycidyl methacrylate.

The content of stabilized colloidal silica in these recipes corresponds to about .5% based on the weight of the polymerizable organic monomers except in Example 4 where the concentration is 1% of colloidal silica on said basis and in composition A, a comparative product in which the colloidal silica is not present.

The specified sodium stabilized silica aquasol is "Ludox" LS colloidal silica having a relatively low concentration of stabilizing alkali, but any one of the products described in Table 1 or mixture thereof can be used as the colloidal silica component. The concentration of the aquasol in the recipe is based on 30% $SiO_2$ content, proportional adjustments can be made in the specified amount of aquasol and the water to compensate for differences in colloidal silica content of the aquasol.

The ammonia stabilized silica aquasol specified in Example 2 is comparable with the sodium stabilized colloidal silica as to the physical characteristics of the colloidal silica. The colloidal silica content is 25%, the weight ratio of $SiO_2$ to $NH_3$ is about 115 per part of $NH_3$ and the approximate particle diameter is 17 milli-microns.

In preparing the aqueous dispersion products of these polymerization recipes, the first portion of the respective compositions is charged into a weigh tank and homogeneously mixed using an Eppenbach Homo-Mixer comprising a multibladed rotor having a rotor-stator clearance of from about .030 to .0625 inch operated at a peripheral speed of about 60 feet per second. This homogenizing operation has access to the air and ordinarily sufficient air is introduced into the aqueous composition to saturate it. The resulting mixture is transferred to a polymerization kettle and heated to 60° C. with moderate agitation.

The potassium persulfate is predissolved in the water of the second portion and the resulting solution is added to the first portion. The combined portions are held at about 60° C. with moderate agitation until the exothermic reaction subsided, a time period of about three hours. The resulting aqueous dispersion polymer composition is held at about 60° C. for an additional hour during which time the dispersion is examined for completeness of conversion, particle size and relative viscosity. Thereafter the resulting acidic aqueous dispersion product is stabilized by partial ammoniacal neutralization of the acidic carboxyls by addition of the third portion, preferably to a pH of from 5.5 to 6, cooled to 30° C. with agitation and filtered to remove coagulated particles and polymer grit.

Monomer conversion with the above recipes ordinarily is at least 97.5%.

Wire enamel compositions are prepared from the resulting aqueous dispersion products according to the following formulation.

*Wire Enamel Composition*

| | Percent by wt. |
|---|---|
| Aqueous dispersion copolymer product—34.4% (Product of Composition A or B or Examples 1–5) | 90.00 |
| Ammonium hydroxide—to pH of about 7.6 | .44 |
| Water-dilutable, heat-reactive phenol/formaldehyde resin—66% in water | 2.43 |
| Water | 7.13 |
| | 100.00 |

The respective aqueous dispersion products of the polymerization recipes are transferred to a heat-bodying kettle and moderately agitated while the ammonium hydroxide is slowly added to a pH of about 7.6. This neutralized aqueous dispersion is heated to 77° C., and then held at 75° C.–76° C. for 30 minutes with continuous agitation. Thereafter the water-dilutable heat-reactive phenol/formaldehyde resin, Bakelite BRL-1100 having a resin content of 66% in water, is premixed with the indicated additional water and added to the dispersion. Mixing is continued after the addition for 10 minutes with the temperature held at about 75° C. The product is then cooled to about 30° C. preferably room temperature.

These wire enamel compositions are characterized by a non-volatile content of 32.5% having a composition of 95% of the copolymer and 5% by weight of the phenolic resin. They are further characterized by a viscosity of approximately 50 centipoises at 25° C. using a #1 Spindle with the Brookfield viscosimeter at 6 r.p.m.

The surface tension values of the wire enamel compositions formulated with the comparative compositions A and B are 40 dynes/cm. and 43 dynes/cm. respectively as compared with 59.4 dynes/cm. for the wire enamel composition prepared from the aqueous dispersion copolymer product of Example 1. Wire enamel compositions formulated with the invention aqueous dispersion copolymer products of Examples 1 through 5 are all characterized by a surface tension of from about 55 dynes/cm. to about 62 dynes/cm. Another series of the invention wire enamel compositions similarly formulated having a relative proportion of 90% copolymer and 10% of the modifying phenol-formaldehyde condensate exhibits the same high values of surface tension and improved application characteristics.

For application to copper wire, the aqueous wire enamel compositions are ammoniacally adjusted to a pH of from 9 to 10 and diluted with water to a non-volatile content of 20%. These diluted enamels are coated on 18.5 AWG and 23 AWG copper wire using ordinary commercial wire-coating equipment under ordinary coating conditions, the curing oven temperature being from 550° F. to 700° F. at the bottom and increasing to about 900° F. at the top for the 18 AWG wire and from 500° F. at the bottom to 700° F. for the 23 AWG wire. The wire enamel products derived from Examples 1 through 5 satisfactorily coat 18 AWG wire at speeds up to 50 feet per minute with a resulting increase in diameter of about 4 mils over the diameter of the uncoated wire at this speed. A diameter increase of 3 mils corresponding to coating with wire enamels derived from comparative products A and B at 30 feet per minute is easily attained at a coating speed of 38 feet per minute with the invention compositions.

On 23 AWG wire, the maximum operable coating speed for the wire enamel compositions prepared from comparative products A and B is between 25 and 30 feet per minute with an increase in diameter of about 1.4 mils. This coating thickness is easily achieved with the invention compositions at 34 feet per minute. When the non-volatile content of the coating bath using the invention products is increased to 22.5%, a coating speed of 45 feet per minute provides a diameter increase of about 2 mils. At 24.5% application non-volatile content, satisfactory coatings corresponding to a diameter increase of from 2.5 to 2.8 mils are obtained with coating speeds of from 46 to 55 feet per minute with wire enamels based on the products of Examples 1–5.

Still other coating tests using fine wire having a size up to 30 AWG show satisfactory operable coating speeds up to 65 feet per minute with these invention products.

The wire-coating performance of the enamel derived from the comparative product composition B is no better than the inadequate performance at high coating speeds of the enamel derived from the comparative product composition A. These results show that the presence of small proportions of conventional emulsifiers at a concentration significantly lower than that ordinarily specified in emulsion polymerization recipes, is ineffective, even in the presence of colloidal silica, toward providing the desirable improved application characteristics resulting from practice of the described invention.

Specimens of wire coated with the respective wire enamel compositions and tested according to N.E.M.A. tests and other standard electrical tests are found to be equal in electrical properties and performance under adverse conditions. The enamel derived from the copolymer of Example 4 is softer and more thermoplastic than the other enamel compositions. While this characteristic may deter its use in the wire coating field, this composition is excellent for impregnating fiber-glass matts, glass-cloth, paper, textiles of natural and synthetic fibers, woven and unwoven, for production of electrical insulating materials useful as slot-liners in motors and generators and as insulating panels.

Although the primary utility of the invention compositions is as coatings for electrical insulating purposes, they can be used for coating purposes in general. In the metal protective field a coating composition having the following non-volatile content is particularly effective.

*Coating for Metal Protection*

| | Parts by wt. non-volatile content |
|---|---|
| Copolymer product of Example 1—sufficient to provide | 100 |
| "Bakelite" BRL–1100 or BR–15100 water-dilutable, heat-reactive phenol/formaldehyde condensate (66% non-volatile content in water) sufficient to provide | 10 to 40 |
| Particulate polytetrafluoroethylene — solids of "Teflon" aqueous suspensoid sufficient to provide | 150 |

This coating deposited from an aqueous dispersion and cured at a temperature of from 400° F. to 500° F. exhibits many of the desirable characteristics found in "Teflon" polytetrafluoroethylene resin coatings deposited from an aqueous suspensoid and cured by fusion at sintering temperatures.

In the above composition, the particulate polytetrafluoroethylene functions as an inert pigment in the coalesced copolymer product coating. The dispersed particulate polytetrafluoroethylene provides the cured coating with increased chemical resistance, release properties and lubricity. Coatings having these characteristics are useful in metal protection and are particularly useful for coating cartridge cases which are subject to severe exposure conditions.

It is apparent that many widely different embodiments of the invention may be made without departing from the spirit and scope thereof and, therefore, it is intended not to be limited except as defined by the appended claims.

We claim:

1. A method of preparing an aqueous dispersion copolymer composition, characterized by a surface-tension value of at least 50 dynes/cm. and improved application properties dependent on said high surface tension, which comprises the steps of (a) preparing an aqueous dispersion polymerization charge by homogeneously dispersing in water a mixture of polymerizable alpha ethylenically unsaturated monomers, at least ternary in composition, consisting essentially of a carboxylic acid monomer (A) and non-carboxylic acid monomers (B) and (C) as hereinafter defined, in the proportion of from 10% to 60% based on the weight of said aqueous polymerization charge and including in said aqueous polymerization charge an effective small proportion of a polymerization catalyst for monomers having vinylidene unsaturation and from 0.1% to 5%, based on the weight of said polymerizable monomers, of colloidal silica particles having a particle diameter of from 5 millimicrons to 150 millimicrons, said colloidal silica particles being introduced as an aquasol of alkali-stabilized colloidal silica particles, said aqueous polymerization charge being free of other surface active functioning components, (b) copolymerizing said polymerizable monomers by heating said aqueous polymerization charge at a temperature up to the boiling temperature of the monomer charge, (c) ammoniacally adjusting the resulting aqueous dispersed carboxylic acid copolymer to a pH of from 5.5 to 8, thereby forming an ammonium salt of said carboxylic acid copolymer, and (d) stabilizing the resulting aqueous dispersion of said copolymeric ammonium salt by heating said aqueous copolymeric dispersion at a temperature from 45° C. to 95° C. and thereafter cooling the aqueous copolymeric dispersion composition to room temperature, said mixture of polymerizable alpha ethylenically unsaturated monomers essentially comprising (A) from 1% to 15% of at least one polymerizable alpha monoethylenically unsaturated monocarboxylic acid having the general formula

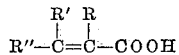

at least one of said three radicals R—, R′ and R″— being H—, (B) from 15% to 65% of at least one ester of a $C_1$ to $C_{20}$ saturated monohydric alcohol and a polymerizable alpha monoethylenically unsaturated monocarboxylic acid having said unsaturation in the form of an alpha bound terminal methylene group as characterized by the general formula

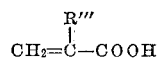

and (C) from 30% to 80% of at least one nitrile of a polymerizable alpha monotheylenically unsaturated monocarboxylic acid having said unsaturation in the form of an alpha bound terminal methylene group as characterized by the general formula

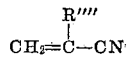

wherein said respective general formulas R—, R′—, R″—, R‴—, and R⁗— are each a radical selected from the group consisting of H—, $C_1$–$C_6$ saturated alkyl hydrocarbon radicals and phenyl, the sum of the percentages of said polymerizable monomers (A), (B) and (C) totaling 100% by weight.

2. The method of claim 1 in which said stabilized silica aquasol is present in an amount sufficient to provide from .25% to 2% of colloidal silica particles based on the total weight of said polymerizable monomers.

3. The method of claim 1 in which said aquasol of alkali-stabilized colloidal silica particles contains an amount of stabilizing alkali corresponding to from 75 to 700 parts by weight of said colloidal $SiO_2$ per part of $Na_2O$.

4. The method of claim 1 in which the total weight of said polymerizable monomers is from 10% to 50% based on the weight of said aqueous polymerization charge and said copolymerization step (b) is effected at a temperature of from 50° to 70° C.

5. The method of claim 1 in which said mixture of polymerizable monomers further includes (D) from 0.3% to 25%, based on the total weight of said polymerizable monomer mixture, of an auxiliary copolymerizable vinylidene-unsaturated monomer selected from the group consisting of aromatic hydrocarbons having from 1 to 2 vinylidene groups per molecule, monoesters of said monoethylenically-unsaturated monocarboxylic acid having said general formula $$CH_2=\underset{\underset{R'''}{|}}{C}-COOH$$

with 2,3-epoxypropanol-1 and diesters of polymethylene glycols and polyoxyalkylene glycols with at least one said monoethylenically-unsaturated monocarboxylic acid having said general formula $$CH_2=\underset{\underset{R'''}{|}}{C}-COOH$$

where R'''— is as defined.

6. The method of claim 1 which includes an additional step subsequent to said step (c) of admixing from 1% to 40%, based on the weight of said copolymer, of at least one water-dilutable, heat-reactive formaldehyde condensate with said aqueous dispersion of the ammonium copolymeric salt resulting from said step (c), said formaldehyde condensate being selected from the group consisting of water-dilutable reactive condensates of phenol/formaldehyde, ketone/formaldehyde, ketone/urea/formaldehyde, urea/formaldehyde, melamine/formaldehyde, and urea/melamine/formaldehyde.

7. The method of claim 6 in which said water-dilutable heat-reactive condensate is a phenol/formaldehyde condensate present in an amount from 3% to 15% based on the weight of said copolymer.

8. A method of preparing an aqueous dispersion copolymer wire enamel composition, characterized by a surface tension of from about 50 to about 70 dynes/cm. and improved application properties dependent on said surface tension characteristic, which comprises the process steps of (a) preparing an aqueous dispersion polymerization charge by homogeneously dispersing in water a ternary mixture of monoethylenically unsaturated organic monomers consisting of (A) from 2% to 10% of methacrylic acid, (B) from 23% to 45% of butyl acrylate and (C) from 45% to 75% of acrylonitrile, the sum of said monomer percentages totaling 100% by weight and said ternary mixture being present in an amount from 25% to 45% based on the weight of said aqueous polymerization charge, and including in said polymerization charge from 0.25% to 2% of colloidal silica particles based on the weight of said polymerizable monomers, and an effective small proportion of a water-soluble vinyl polymerization redox catalyst consisting essentially of a soluble bisulfite and a soluble persulfate, (b) copolymerizing said polymerizable monomers at a temperature in the range of from 50° C. to 70° C., (c) ammoniacally adjusting the resulting aqueous dispersion of carboxylic acid ternary copolymer to a pH of 5.5 to 6, thereby forming an ammonium salt of said dispersed ternary copolymer, and filtering to remove polymer coagulum and foreign matter, (d) further ammoniacally adjusting the resulting aqueous dispersion of said ammonium terpolymer salt to a pH of from 6.7 to 7.7, heating said aqueous ammonium terpolymer salt dispersion at a temperature from 65° C. to 90° C. for from 15 minutes to 120 minutes and thereafter cooling to about room temperature, thereby stabilizing said aqueous ammoniacal terpolymer salt dispersion, and (e) mixing therewith a water-dilutable, heat-reactive phenol/formaldehyde condensate in an amount from 3% to 15% based on the weight of said ternary copolymer, said colloidal silica particles being introduced in said polymerization charge as an aquasol of alkali-stabilized colloidal silica particles having a particle diameter of from 5 to 150 millimicrons and which are stabilized by an amount of alkali corresponding to one part by weight of $Na_2O$ per 75 to 700 parts of $SiO_2$, said aqueous polymerization charge being free of other surface active functioning components.

9. A stable aqueous dispersion copolymer salt composition, characterized by a surface tension of at least 50 dynes/cm., comprising as the dispersed particulate phase an ammonium salt of a carboxylic acid copolymer, at least ternary in composition, of an alpha ethylenically unsaturated monomer mixture comprising (A) from 1% to 15% of at least one polymerizable alpha monoethylenically unsaturated monocarboxylic acid having the general formula $$R''-\underset{\underset{R'}{|}}{C}=\underset{\underset{R}{|}}{C}-COOH$$

at least one of said three radicals R—, R'—, and R''— being H—, (B) from 15% to 65% of at least one ester of a $C_1$-$C_{20}$ saturated monohydric alcohol and a polymerizable alpha monoethylenically unsaturated monocarboxylic acid having said unsaturation in the form of an alpha bound terminal methylene group as characterized by the general formula $$CH_2=\underset{\underset{R'''}{|}}{C}-COOH$$

(C) from 30% to 80% of at least one nitrile of a polymerizable alpha monoethylenically unsaturated monocarboxylic acid having said unsaturation in the form of an alpha bound terminal methylene group as characterized by the following general formula for said nitrile $$CH_2=\underset{\underset{R''''}{|}}{C}-CN$$

wherein said respective general formulas, R—, R'—, R''—, R'''— and R''''— are each a radical selected from the group consisting of H—, $C_1$-$C_6$ saturated alkyl hydrocarbon radicals and phenyl, the sum of the percentages of said polymerizable monomers totaling 100% by weight, and from 0.1% to 5%, based on the weight of said polymerizable monomer mixture, of colloidal silica particles characterized by an initial particle diameter of from 5 to 150 millimicrons, and an aqueous continuous phase comprising water, an effective small stabilizing amount of alkali for said colloidal silica and including ammonium ion in an amount sufficient to provide said aqueous dispersion with a pH of from 5.5 to 8.0, said dispersion of particulate carboxylic acid copolymer resulting from polymerization in the presence of said stabilized colloidal silica particles being free of other surface active functioning components.

10. The aqueous dispersion product of claim 9 in which said polymerizable monomer mixture consists of (A) from 1% to 15% of methacrylic acid,
(B) from 15% to 65% of butyl acrylate, and
(C) from 30% to 80% of acrylonitrile.

11. The aqueous dispersion product of claim 9 in which said polymerizable monomer mixture consists of from 75% to 99.7% of said monomer components (A), (B) and (C) in the relative proportions of from 1% to 15% of (A), from 15% to 65% of (B), and from 30% to 80% of (C) totaling 100% of (A)+(B)+(C) and correspondingly from 25% to .3% of (D) at least one auxiliary copolymerizable vinylidene-unsaturated monomer selected from the group consisting of aromatic hydrocarbons having from 1 to 2 vinylidene groups per molecule, monoesters of said monoethylenically-unsaturated monocarboxylic acid having said general formula $$CH_2=\underset{\underset{R'''}{|}}{C}-COOH$$

with 2,3-epoxypropanol-1 and diesters of polymethylene glycols and polyoxyalkylene glycols with at least one said monoethylenically-unsaturated monocarboxylic acid having said general formula $$CH_2=\underset{\underset{R'''}{|}}{C}-COOH$$

where R'''— is as defined.

12. The composition of claim 11 in which said auxiliary polymerizable monomer (D) is a styrene.

13. The composition of claim 11 in which said auxiliary polymerizable monomer (D) is glycidyl methacrylate.

14. The aqueous dispersion composition of claim 9 containing dispersed therein at least one water-dilutable, heat-reactive formaldehyde condensate in an amount from 1% to 40% based on the weight of said copolymer, said formaldehyde condensate being selected from the group consisting of water-dilutable, heat-reactive condensates of phenol/formaldehyde, ketone/formaldehyde, ketone/urea/formaldehyde, urea/formaldehyde, melamine/formaldehyde, and urea/melamine/formaldehyde.

15. The composition of claim 14 in which said water-dilutable, heat-reactive formaldehyde condensate is a phenol/formaldehyde condensate.

16. An aqueous dispersion wire enamel composition, characterized by a surface tension of at least 50 dynes/cm. and improved application properties dependent on said surface tension characteristics, comprising as the dispersed particulate phase thereof an ammonium salt of a particulate carboxylic acid copolymer of a polymerizable mixture, at least ternary in composition, of alpha ethylenically unsaturated monomers essentially including a monocarboxylic acid component, an ester component and a nitrile component, 0.25% to 2% of colloidal silica particles based on the weight of said monomers, 3% to 15% of a water-dilutable, heat-reactive phenol/formaldehyde condensate based on the weight of said carboxylic acid copolymer, and a continuous aqueous phase comprising water, alkali in a small effective stabilizing proportion for said colloidal silica corresponding to one part of $Na_2O$ by weight per 75 to 700 parts of said colloidal $SiO_2$ and ammonium ion in an amount sufficient to provide said aqueous dispersion with a pH of from 5.5 to 8.0, said colloidal silica particles as charged being characterized by a particle diameter of from 5 millimicrons to 150 millimicrons, said ammonium salt being present in an amount corresponding to a concentration of said carboxylic acid copolymer in the range of 25% to 45% based on the total weight of the composition, said carboxylic acid copolymer being the aqueous dispersion polymerization product of a mixture of polymerizable alpha ethylenically unsaturated monomers, at least ternary in composition, essentially comprising (A) from 2% to 10% of at least one polymerizable alpha monoethylenically unsaturated monocarboxylic acid having the general formula $$R''-\overset{R'}{\underset{|}{C}}=\overset{R}{\underset{|}{C}}-COOH$$

at least one of said three radicals R—, R'— and R"— being H—, (B) from 15% to 65% of at least one ester of a $C_1$–$C_8$ saturated aliphatic monohydric alcohol and a polymerizable alpha monoethylenically unsaturated monocarboxylic acid having said unsaturation in the form of an alpha bound terminal methylene group as characterized by the general formula $$CH_2=\overset{R'''}{\underset{|}{C}}-COOH$$

(C) from 30% to 80% of at least one nitrile of a polymerizable alpha monoethylenically unsaturated monocarboxylic acid having said unsaturation in the form of an alpha bound terminal methylene group as characterized by the following general formula for said nitrile $$CH_2=\overset{R''''}{\underset{|}{C}}-CN$$

wherein said respective general formulas R—, R'—, R"—, R'''— and R''''— are each a radical selected from the group consisting of H—, $C_1$–$C_6$ saturated alkyl hydrocarbon radicals and phenyl, the sum of the percentages of said polymerizable monomers totaling 100% by weight, said dispersion of particulate carboxylic acid copolymer resulting from polymerization in the presence of said stabilized colloidal silica particulates being free of other surface active functioning components.

17. The composition of claim 16 characterized by a surface tension of from 55 to 62 dynes/cm. wherein said monomer component (A) is methacrylic acid, said monomer component (B) is butyl acrylate and said monomer component (C) is acrylonitrile.

References Cited in the file of this patent

UNITED STATES PATENTS

| | | |
|---|---|---|
| 2,574,902 | Bechtold | Nov. 13, 1951 |
| 2,760,941 | Iler | Aug. 28, 1956 |
| 2,786,042 | Iler | Mar. 19, 1957 |
| 2,787,603 | Sanders | Apr. 2, 1957 |

FOREIGN PATENTS

| | | |
|---|---|---|
| 643,045 | Great Britain | Sept. 15, 1950 |